United States Patent
Ostergaard et al.

(10) Patent No.: US 9,572,126 B2
(45) Date of Patent: Feb. 14, 2017

(54) DETERMINING EFFECTS ON COMMUNICATION SIGNALS

(71) Applicant: Norwood Systems Pty Ltd, Nedlands, Western Australia (AU)

(72) Inventors: Paul Frederick Norwood Ostergaard, Nedlands (AU); David Alexander Wilson, Nedlands (AU); Andrew Phillip Mason, Nedlands (AU)

(73) Assignee: Norwood Systems Pty Ltd, Nedlands, Western Australia (AU)

( * ) Notice: Subject to any disclaimer, the term of this patent is extended or adjusted under 35 U.S.C. 154(b) by 0 days.

(21) Appl. No.: 14/779,987

(22) PCT Filed: Apr. 4, 2014

(86) PCT No.: PCT/AU2014/000369
§ 371 (c)(1),
(2) Date: Sep. 25, 2015

(87) PCT Pub. No.: WO2014/161045
PCT Pub. Date: Oct. 9, 2014

(65) Prior Publication Data
US 2016/0050639 A1    Feb. 18, 2016

(30) Foreign Application Priority Data
Apr. 5, 2013 (AU) ................................. 2013202735

(51) Int. Cl.
*H04W 64/00* (2009.01)
*H04W 4/04* (2009.01)
(Continued)

(52) U.S. Cl.
CPC ............... *H04W 64/00* (2013.01); *H04W 4/00* (2013.01); *H04W 4/02* (2013.01); *H04W 4/021* (2013.01);
(Continued)

(58) Field of Classification Search
CPC ......... H04W 4/043; H04W 64/00; H04W 4/02
(Continued)

(56) References Cited

U.S. PATENT DOCUMENTS 7,840,227 B2    11/2010  Kahlert et al.
2003/0043073 A1  3/2003  Gray et al.
(Continued)

FOREIGN PATENT DOCUMENTS

WO    2012066559 A1    5/2012

OTHER PUBLICATIONS

International Preliminary Report on Patentability received in PCT/AU2014/000369, mailed Aug. 7, 2015.
(Continued)

*Primary Examiner* — Sam Bhattacharya
(74) *Attorney, Agent, or Firm* — Suzannah K. Sundby, Esq.; Canady + Lortz LLP

(57) ABSTRACT

A system (10) for determining effects of one or more factors on one or more properties of a signal received by a wireless communication enabled device (24), the system (10) comprising: at least one sensor for sensing and gathering sensor data relating to a state of the wireless communication enabled device (24) or a state of the environment surrounding the wireless communication enabled device; and decision means for receiving input including the sensor data and determining whether one or more criteria are satisfied based on the input, each criteria being associated with a respective factor affecting a respective property, and determining the effects on the one or more properties of the signal on the basis of the criteria determination.

31 Claims, 4 Drawing Sheets

(51) Int. Cl.
*H04W 4/02* (2009.01)
*H04W 4/00* (2009.01)
H04W 36/08 (2009.01)
H04W 36/32 (2009.01)

(52) U.S. Cl.
CPC ............. *H04W 4/043* (2013.01); *H04W 36/08* (2013.01); *H04W 36/32* (2013.01)

(58) Field of Classification Search
USPC .......... 455/226.2, 456.1, 456.2, 456.3, 456.6
See application file for complete search history.

(56) References Cited

U.S. PATENT DOCUMENTS

| | | |
|---|---|---|
| 2005/0185615 A1 | 8/2005 | Zegelin |
| 2006/0099952 A1 | 5/2006 | Prehofer |
| 2008/0299927 A1 | 12/2008 | Tenbrook et al. |
| 2009/0253421 A1 | 10/2009 | Camp, Jr. et al. |
| 2010/0003939 A1 | 1/2010 | Kong et al. |
| 2010/0130206 A1 | 5/2010 | Chin et al. |
| 2011/0117924 A1 | 5/2011 | Brunner et al. |
| 2013/0237272 A1 | 9/2013 | Prasad |

OTHER PUBLICATIONS

International Search Report received in PCT/AU2014/000369, mailed Jun. 17, 2014.

Bose, et al., "A practical path loss model for indoor WiFi positioning enhancement", Dec. 10, 2007, pp. 1-5, Publisher: Information, Communications & Signal Processing, 2007 6th International Conference on IEEE.

Extended European Search Report received in EP14780132, mailed Sep. 5, 2016.

(a) Patch Antenna Model (b) Patch Antenna 3D Radiation Pattern (c) Patch Antenna Azimuth Plane Pattern (d) Patch Antenna Elevation Plane Pattern

DETERMINING EFFECTS ON COMMUNICATION SIGNALS

TECHNICAL FIELD

The present invention relates generally to communications, and in particular, to a system, device, and method for determining effects of one or more factors on one or more properties of a signal received by a mobile communication device or station in a wireless communication network.

BACKGROUND ART

Each document, reference, patent application, or patent cited in this text is expressly incorporated herein in its entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

In a multi-cell wireless network, there are multiple network access points, which may be fixed wireless base stations, with which devices, such as mobile devices or mobile stations, may establish a connection, in order to access the wireless network. For example, the wireless communication technology used may be Wi-Fi. The mobile device may establish a connection with a particular access point to access the wireless network.

Accurate estimation or determination of a location or position of a mobile device within the network is useful for implementing actions. Such actions may include, for example, various location-based services, and handover procedures.

The location or position of a mobile device within the network is typically obtained via localization using Received Signal Strength Indication (RSSI) of radio signals, as seen by the device or the access point.

Sources of uncertainty arise when using such techniques that may lead to the determined location of the device being inaccurate.

One source of uncertainty especially arises when the device is a telecommunications device such as a smartphone. Particularly, anisotropic wireless reception characteristics of the smartphone may potentially reduce the RSSI as seen from one or more of the access points being used in the localization process.

Another source of uncertainty arises in situations where there is a source of signal obstruction or interference near the device, such as the head of a user in the case of a smartphone being used in a typical or normal mode of operation next to a person's head, which may also potentially reduce the RSSI as seen from one or more of the access points being used in the localization process.

It is against this background that the present invention has been developed.

SUMMARY OF INVENTION

The present invention seeks to overcome to at least some extent, or at least ameliorate, one or more of the deficiencies of the prior art mentioned above, or to provide the consumer with a useful or commercial choice.

Other advantages of the present invention will become apparent from the following description, taken in connection with the accompanying drawings, wherein, by way of illustration and example only, preferred embodiments of the present invention are disclosed.

According to a first broad aspect of the present invention, there is provided a system for determining effects of one or more factors on one or more properties of a signal received by a wireless communication enabled device, the system comprising:

at least one sensor for sensing and gathering sensor data relating to a state of the wireless communication enabled device or a state of the environment surrounding the wireless communication enabled device; and decision means for receiving input including the sensor data, determining whether one or more criteria are satisfied based on the input, each criteria being associated with a respective factor affecting a respective property, and determining the effects on the one or more properties of the signal on the basis of the criteria determination, wherein the one or more factors include proximity to a source of at least potential obstruction or interference, and wherein the source comprises the head of a user or operator of the wireless communication enabled device.

Preferably, the one or more properties include attenuation of the signal.

Preferably, the one or more factors also include: anisotropic signal reception properties of the wireless communication enabled device; and orientation of the wireless communication enabled device.

Preferably, the wireless communication enabled device is operable to communicate with a wireless communication network, and the sensor data includes signal data of or associated with respective one or more signals from the wireless communication network.

Preferably, the system further comprises correction means for applying a signal correction correcting for the determined effects to at least one of the one or more received signal data based on the determination(s) made by the decision means to provide at least one corrected signal data.

Preferably, the system further comprises action means for implementing an action based on the at least one corrected signal data.

Preferably, the action means comprises estimation means for estimating a location of the wireless communication enabled device based on the at least one corrected signal data.

In a preferred embodiment of the invention, the system comprises a controller controllable by electronic program instructions, and wherein at least one of the decision means, correction means, and action means are implemented as electronic program instructions stored on a storage means. In such an embodiment, the controller may comprise processing means, and the storage means, in addition to storing electronic program instructions for controlling the controller, may also store information or data including the signal correction.

The estimation may comprise an accurate determination of the location or position of the wireless communication enabled device.

Preferably, the mobile communication device operates within or is associated with the wireless communication network.

Preferably, the signal correction comprises a signal correcting factor.

Preferably, the decision means further determines to which of the one or more received signal data the signal correction is to be applied.

Preferably, the decision means further determines whether to implement an action based on the estimated location of the wireless communication enabled device.

Preferably, there is a plurality of signal corrections, and the decision means further determines which one or more of the plurality of signal corrections is to be applied.

Preferably, the system further comprises performance modelling means operable to use the input to construct a model or representation of one or more performance characteristics of the wireless communication enabled device. The performance characteristics may include the wireless communication enabled device's signal reception properties. The decision means may then be further operable to analyse the representation to determine whether the one or more criteria are satisfied. The analysis may comprise comparing the representation with, or testing it against, the criteria.

Preferably, the performance modelling means is operable to adjust or modify the model or representation according to the input.

Preferably, the at least one sensor comprises part of a set of sensors. The set of sensors may comprise a sensor system.

Preferably, the state of the wireless communication enabled device comprises at least one of an operating mode, an orientation, a velocity, a speed, a position, and proximity to an external body.

Preferably, the signal data comprises a Received Signal Strength Indication (RSSI) measurement of the power present in the respective signal.

Preferably, the state of the environment surrounding the wireless communication enabled device comprises at least one and more preferably a plurality of signal strengths sensed.

Preferably, the state of the environment surrounding the wireless communication enabled device comprises data, information, details or knowledge of or associated with the wireless communication network. This may include a network topology, including physical and logical topology, and a network performance. In such an embodiment, the sensing may comprise receiving or accessing a store of such data, information, details or knowledge, which may be stored on the storage means.

Preferably, the state of the environment surrounding the wireless communication enabled device comprises a proximity to a source of at least potential obstruction or interference. The source may comprise the head of a user or operator of the wireless communication enabled device.

Preferably, the wireless communication enabled device further comprises at least one of the at least one sensor and the decision means, and, if provided, the correction means, and the action means.

Preferably, the wireless communication enabled device further comprises an acquisition or receiving means for receiving the sensor data and outputting the sensor data as an input to the decision means.

Preferably, the wireless communication network comprises a plurality of access points, wherein each of the access points provides network coverage in a vicinity thereof.

Preferably, the wireless communication enabled device is operable to establish a connection with one of the plurality of access points to communicate with the wireless communication network.

Preferably, the sensor comprises at least one of a signal strength sensor, an acceleration sensor, an orientation sensor, a direction sensor, a position sensor, and a proximity sensor.

Preferably, the signal strength sensor is operable to measure the signal strength at the wireless communication enabled device associated with one or more of the plurality of access points and to generate a signal strength indicator in the form of a Received Signal Strength Indication (RSSI) based on the signal strength measured with respect to each of the one or more of the plurality of access points.

In embodiments where the signal data comprises an RSSI, the corrected signal data comprises corrected RSSI, and the estimation means estimates the location of the wireless communication enabled device based on the corrected RSSI.

Preferably, the location estimate is determined via a wireless localization method using a plurality of corrected RSSI.

Preferably, the acceleration sensor is operable to measure an acceleration of the wireless communication enabled device and to generate an acceleration data based on the acceleration measured.

Preferably, the acceleration sensor is an accelerometer.

Preferably, the accelerometer is operable to sense accelerations in three orthogonal axes.

Preferably, the orientation sensor is operable to measure a rate of change of the orientation of the wireless communication enabled device and to generate an orientation data based on the rate of change of the orientation measured.

Preferably, the orientation sensor is a gyroscope.

Preferably, the gyroscope is operable to sense rotations in three orthogonal axes.

Preferably, the direction sensor is operable to determine a direction relative to the Earth's magnetic poles.

Preferably, the direction sensor is an electronic compass.

Preferably, the electronic compass comprises a magnetometer operable to sense the Earth's magnetic field in three orthogonal axes.

Preferably, the action comprises making a handover of the connection the wireless communication enabled device has established with a serving access point of the plurality of access points to a target access point of the plurality of access points. In embodiments of the invention, the action may comprise additional or alternative actions including determining and providing notification of a location in an indoor environment and/or operating a device.

According to a second broad aspect of the present invention, there is provided a method for determining effects of one or more factors on one or more properties of a signal received by a wireless communication, the method comprising:

sensing and gathering sensor data relating to a state of the wireless communication enabled device or a state of the environment surrounding the wireless communication enabled device; and receiving input including the sensor data, determining whether one or more criteria are satisfied based on the input, each criteria being associated with a respective factor affecting a respective property, and determining the effects on the one or more properties of the signal on the basis of the criteria determination, wherein the one or more factors include proximity to a source of at least potential obstruction or interference, and wherein the source comprises the head of a user or operator of the wireless communication enabled device.

Preferably, the one or more properties include attenuation of the signal.

Preferably, the one or more factors also include: anisotropic signal reception properties of the wireless communication enabled device; and orientation of the wireless communication enabled device.

Preferably, the wireless communication enabled device is operable to communicate with a wireless communication network, and the sensor data includes signal data of or associated with respective one or more signals from the wireless communication network.

Preferably, the method further comprises applying a signal correction correcting for the determined effects to at least one of the one or more received signal data based on the determination(s) made to provide at least one corrected signal data.

Preferably, the method further comprises implementing an action based on the at least one corrected signal data.

Preferably, the action comprises estimating a location of the wireless communication enabled device based on the at least one corrected signal data.

Preferably, the estimation comprises an accurate determination of the location or position of the wireless communication enabled device.

Preferably, the signal correction comprises a signal correcting factor.

Preferably, the method further comprises determining to which of the one or more received signal data the signal correction is to be applied.

Preferably, the method further comprises determining whether to implement an action based on the estimated location of the wireless communication enabled device.

Preferably, there is a plurality of signal corrections, and the method further comprises determining which one or more of the plurality of signal corrections is to be applied.

Preferably, the method further comprises performance modelling using the input to construct a model or representation of one or more performance characteristics of the wireless communication enabled device.

Preferably, the performance characteristics include signal reception properties of the wireless communication enabled device.

Preferably, the method further comprises analysing the model or representation to determine whether the one or more criteria are satisfied.

Preferably, the analysis comprises comparing the model or representation with, or testing it against, the criteria.

Preferably, the performance modelling comprises adjusting or modifying the model or representation according to the input.

Preferably, the state of the wireless communication enabled device comprises at least one of an operating mode, an orientation, a velocity, a speed, a position, and proximity to an external body.

Preferably, the sensor data includes signal data comprising a Received Signal Strength Indication (RSSI) measurement of the power present in the respective signal.

Preferably, the state of the environment surrounding the wireless communication enabled device comprises at least one and more preferably a plurality of signal strengths sensed.

Preferably, the state of the environment surrounding the wireless communication enabled device comprises data, information, details and/or knowledge of or associated with the wireless communication network, including a network topology, including physical and logical topology, and a network performance.

Preferably, the sensing comprises receiving or accessing a store of such data, information, details or knowledge.

Preferably, the state of the environment surrounding the wireless communication enabled device comprises a proximity to a source of at least potential obstruction or interference.

Preferably, the source comprises the head of a user or operator of the wireless communication enabled device.

Preferably, the wireless communication network comprises a plurality of access points, wherein each of the access points provides network coverage in a vicinity thereof.

Preferably, the method further comprises establishing a connection between the wireless communication enabled device and one of the plurality of access points to communicate with the wireless communication network.

Preferably, the sensor data comprises at least one of a signal strength data, an acceleration data, an orientation data, a direction data, a position data, and a proximity data.

Preferably, when the sensor data comprises a signal strength data, the signal strength data comprises one or more Received Signal Strength Indication (RSSI) based on signal strength measured at the wireless communication enabled device with respect to each of the one or more of the plurality of access points.

Preferably, when the signal data comprises an RSSI, the corrected signal data comprises corrected RSSI, and the method comprises estimating the location of the wireless communication enabled device based on the corrected RSSI.

Preferably, the location estimate is determined via a wireless localization method using a plurality of corrected RSSI.

Preferably, when the sensor data comprises acceleration data, the acceleration data is: determined based on an acceleration of the wireless communication enabled device; and/or generated by an accelerometer; and/or generated by an accelerometer operable to sense accelerations in three orthogonal axes.

Preferably, when the sensor data comprises orientation data, the orientation data is: determined based on a rate of change of the orientation of the wireless communication enabled device; and/or generated by a gyroscope; and/or generated by a gyroscope operable to sense rotations in three orthogonal axes.

Preferably, when the sensor data comprises direction data, the direction data is: determined based on a direction relative to the Earth's magnetic poles; and/or generated by an electronic compass; and/or generated by an electronic compass comprising a magnetometer operable to sense the Earth's magnetic field in three orthogonal axes.

Preferably, the action comprises: making a handover of a connection the wireless communication enabled device has established with a serving access point of a plurality of access points of the wireless communication network, each of the access points providing network coverage in a vicinity thereof, to a target access point of the plurality of access points; determining and providing notification of a location in an indoor environment; and/or operating a device.

Preferably, the mobile communication device operates within or is associated with the wireless communication network.

According to a third broad aspect of the present invention, there is provided a computer program including at least one command, which, when executed on a computing system, is arranged to perform the method steps in accordance with the second broad aspect of the present invention as hereinbefore described.

According to a fourth broad aspect of the present invention, there is provided a computer readable medium incorporating a computer program in accordance with the third broad aspect of the present invention as hereinbefore described.

According to a fifth broad aspect of the present invention, there is provided a data signal encoding at least one command and being arranged to be receivable by at least one computing system, wherein, when the encoded command is executed on the computing system, the computing system performs the method steps in accordance with the second broad aspect of the present invention as hereinbefore described.

According to a sixth broad aspect of the present invention, there is provided a wireless communication enabled device for use with any of the broad aspects of the present invention as hereinbefore described.

BRIEF DESCRIPTION OF THE DRAWINGS

In order that the invention may be more fully understood and put into practice, preferred embodiments thereof will now be described with reference to the accompanying drawings, in which.

DESCRIPTION OF EMBODIMENTS

Figure 1:
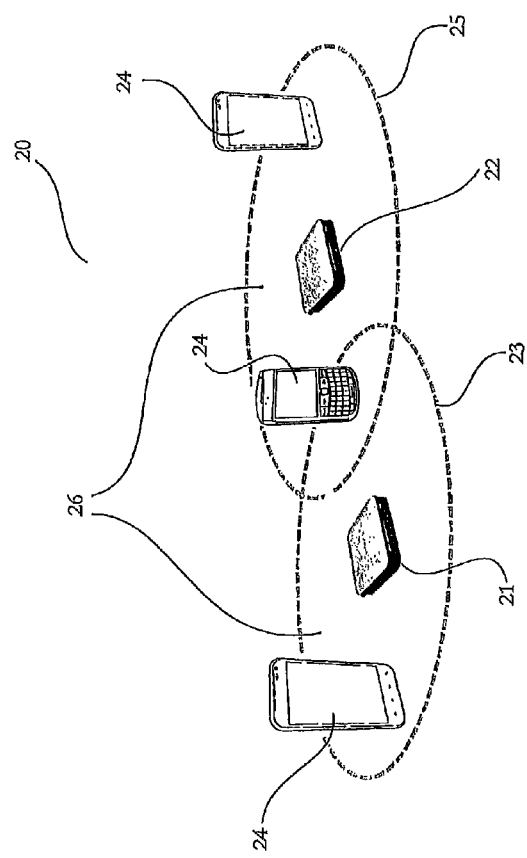
FIG. 1 depicts an embodiment of a multi-cell wireless communication network in accordance with an aspect of the present invention.

In the drawings, like features have been referenced with like reference numbers.

Although the present invention will be described with particular reference to determining effects of factors including anisotropic signal reception properties of a wireless communication enabled device and proximity to a source of at least potential obstruction or interference on a property comprising attenuation of a signal received by the wireless communication enabled device, it will be appreciated that the invention is not limited in this regard. In alternative embodiments of the invention, effects of additional and/or alternative factors on additional and/or alternative signal properties may be determined, as appropriate to the implementation of the invention.

Furthermore, although the present invention will be described with particular reference to implementing an action comprising determining or estimating a location or position of a mobile communication device or station in a wireless communication network operating in an in-building wireless office environment. It will be appreciated that the invention is not limited in this regard and may be applied to wide area cellular networks and indeed any communication environments where it is desirable or useful to locate devices operating therein, and for implementing actions other than, or additional to, determining position or location.

A first embodiment of a system 10 in accordance with an aspect of the present invention is intended to be used in a communication system 20, as depicted in FIG. 1. In the embodiment described the communication system 20 uses wireless technology and comprises a plurality of access points 21, 22 which are wireless base stations or fixed stations for a multi-cell wireless network 26. The access points 21, 22 are operable and configured to transmit and receive radio signals for communication with wireless communication enabled devices or stations 24, such as computers and mobile phones, for example. The wireless communication enabled devices 24 are operable and can establish a connection with one of the access points 21, 22 as a gateway to gain access to a wider network. For example, the wider network may be the World Wide Web (WWW) or the Public Switched Telephone Network (PSTN). The access points 21, 22 may be interconnected using wired or wireless technology (such as wired or wireless Ethernet) (not shown).

The communication system 20 provides the multi-cell wireless network 26 to which the wireless communication enabled devices 24 can establish a connection. Each access point 21, 22 is operable to provide a characteristic amount of individual or corresponding network coverage (or cell) 23, 25 in the vicinity thereof as illustrated in FIG. 1 for the multi-cell wireless network 26. It will be apparent to the person skilled in the art that the network coverage provided by each access point 21, 22 will depend on the type of access point.

In order for the wireless communication enabled device 24 to communicate with the multi-cell wireless network 26, the wireless communication enabled device 24 needs to be located within one of the cells 23, 25 in order to establish a connection having sufficient signal strength with an access point 21, 22 associated with the cell 23, 25.

In FIG. 1, by way of example and not limitation, two access points 21, 22 are shown forming the multi-cell wireless network 26. It will be apparent to the person skilled in the art that the multi-cell wireless network 26 may comprise as many access points as required depending on various factors such as the area of coverage required.

In the embodiment described, the wireless communication enabled device 24 is preferably a mobile or portable computing device, which can be referred to as a mobile station or terminal.

In preferred embodiments of the invention, the device 24 comprises a smartphone such as that marketed under the trade mark IPHONE® by Apple Inc, or by other provider such as Nokia Corporation, or Samsung Group, having Android, WEBOS, Windows, or other Phone app platform. Alternatively, the device 24 may comprise other computing means such as a personal, notebook or tablet computer such as that marketed under the trade mark IPAD® or IPOD TOUCH® by Apple Inc, or by other provider such as Hewlett-Packard Company, or Dell, Inc, for example.

As discussed in the background of this invention, estimation or determination of the location or position of the device 24 in the multi-cell wireless network 26 is useful for implementing actions.

In the embodiment, the system 10 is operable to determine effects of one or more factors on one or more properties of a signal received by the device 24 and apply a correction correcting for the determined effects. The system 10 is then operable to implement one or more actions on, in respect of, related to or associated with the communication system 10. In the described embodiment, such actions comprise a first action of determining or estimating a location of the device 24 based on or taking into account the correction and a second action comprising a handover decision in the multi-cell wireless network 26 is implemented. The handover decision relates to a procedure for triggering the mobile device to establish a new connection with a target access point providing better signal strength when the connection with the serving access point becomes unsatisfactory or less desirable in an attempt to maintain continuous communication with the wireless network. It will be appreciated that the invention is not limited in this regard, and in alternative embodiments additional or alternative actions may be implemented on the basis of the location estimation, or other previous actions. Such other additional or alternative actions may include, for example, location-based services which may be providing notification of the location or position in an indoor environment such as a museum, and/or operating a device.

In the example shown in FIG. 1, as the mobile station 24 moves through the multi-cell wireless network 26 from the cell 23 on the left to the cell 25 on the right of FIG. 1, the connection of the mobile station 24 with the serving access point 21 on the left needs to be handed over to the target access point 22 on the right in order to maintain the communication of the mobile station 24 with the multi-cell wireless network 26.

The embodiment of the system 10 determines the effects of one or more factors on one or more properties of a signal received by the device 24. By accounting for these effects, it improves the accuracy with which the location of the device 24 in the multi-cell wireless network 26 is determined, thereby enhancing the accuracy with which decisions based thereon can be made and actions implemented. In the case where the action comprises making a handover decision, this enhances the reliability and quality of the communication of the mobile station 24 with the multi-cell wireless network 26.

As will be described in further detail, the embodiment of the invention improves the precision of wireless localization methods, by making upfront adjustments to selected signal readings based on knowledge of how the reception characteristics of the device vary with orientation with respect to the location of a transmitting device, and when a human body is likely to be blocking one or more of the wireless paths relating to such readings.

Particularly, the embodiment of the invention uses input from sensors including accelerometer, gyroscope and magnetometer sensors commonly found on modern smartphones, coupled with input comprising knowledge of the underlying geometry of a multiplicity of fixed wireless base stations of the network and the anisotropic wireless reception characteristics of the smartphone, to determine what adjustments should be made to received signal levels, based on knowledge of the orientation of the smartphone relative to the transmitting base stations, prior to processing them via a localization algorithm. Additionally, the embodiment of the invention is operable to use the orientation information to determine if the smartphone user's head is attenuating the signal from any of the aforementioned base stations and, if so, to apply adjustments to the received signal level from any base stations impacted in this manner, prior to passing such readings to the localization algorithm processing.

By compensating for losses introduced by changes in device orientation and the presence of a nearby human body, the embodiment of the invention is able to improve systematically the accuracy of localization algorithms. This facilitates more precise determination of where a mobile communication device is actually located, such information being useful for various location-based services, or for improving multi-cell handover algorithms that are dependent on underlying localization processes.

Figure 2:
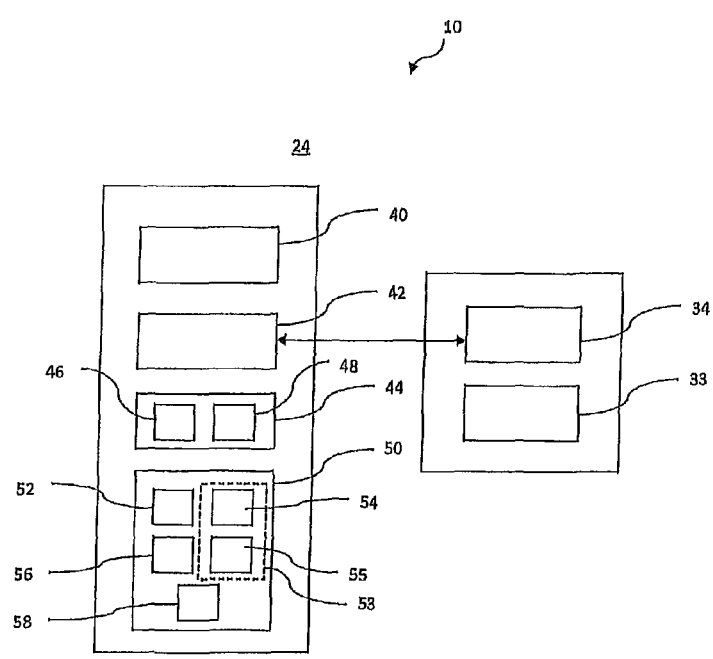
FIG. 2 depicts an embodiment of a system for estimating a location of a wireless communication enabled device in accordance with an aspect of the present invention.

By way of example and without limitation, the system 10 is depicted in FIG. 2. The system 10 comprises the mobile device 24, which is operable to make a handover decision in the multi-cell wireless network 26. Preferably, the system 10 also comprises a server 32, which may be referred to as a mobility management server, which is configured to store and transmit or communicate relevant data or information to the device 24. The data preferably comprises contextual data providing information, details or knowledge of, relating to or associated with the communication system 20. This may include a network topology, including physical and logical topology, and a network performance. In the embodiment described, it includes information pertaining to the layout of the wireless communication system 20 such as the relative position of the access points 21, 22 or other fixed stations of the network 26, the individual area of coverage 25 provided by each access point 21, 22, and so on. The data or information may also be relevant to an action being performed (i.e. making the handover decision in the embodiment described). It will be apparent to the person skilled in the art that the server 32, although preferable, is not essential and the data and information stored in the server 32, rather than being stored remotely, may instead be stored in the device 24.

The device 24 comprises a plurality of components, subsystems or modules operably coupled via appropriate circuitry and connections to enable the device 24 to perform the functions and operations herein described. The device 24 comprises suitable components necessary to receive, store and execute appropriate computer instructions such as a method for determining effects of one or more factors on one or more properties of a signal received by a wireless communication enabled device in accordance with an embodiment of the present invention.

Particularly, the device 24 comprises computing means which in this embodiment comprises a controller and a storage means, device or medium 44 for storing electronic program instructions for controlling the controller, and information or data, including one or more signal corrections. In the embodiment described, the one or more signal corrections comprises one or more signal correcting factors by which at least one received signal or signal data may be adjusted to provide at least one corrected signal or signal data.

The controller comprises processing means in the form of a processor 40 operable for processing/executing instructions and managing the flow of data and information through the mobile station 24. For example, the processor 40 can be any custom made or commercially available processor, a central processing unit (CPU), a data signal processor (DSP) or an auxiliary processor among several processors associated with the mobile station 24. The processor 40 may be a semiconductor based microprocessor (in the form of a microchip) or a macroprocessor, for example.

The storage medium 44 can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The storage medium 44 may incorporate electronic, magnetic, optical and/or other types of storage media. Furthermore, the storage medium 44 can have a distributed architecture, where various components are situated remote from one another, but can be accessed by the processor 40. For example, the ROM may store various instructions, programs, software, or applications to be executed by the processor 40 to control the operation of the device 24 and the RAM may temporarily store variables or results of the operations.

Where the words "store", "hold" and "save" or similar words are used in the context of the present invention, they are to be understood as including reference to the retaining or holding of data or information both permanently and/or temporarily in a storage means, device or medium for later retrieval, and momentarily or instantaneously, for example as part of a processing operation being performed.

Additionally, where the terms "system", "device", and "machine" are used in the context of the present invention, they are to be understood as including reference to any group of functionally related or interacting, interrelated, interdependent or associated components or elements that may be located in proximity to, separate from, integrated with, or discrete from, each other.

Additionally, in embodiments of the invention, the word "determining" is understood to include receiving or accessing the relevant data or information.

The device 24 also comprises a network interface 42 configured to provide data access and/or voice access to the device 24. For example, the network interface 42 may include a transceiver having an antenna for receiving and transmitting wireless signals to enable wireless communication with the access points 21, 22 of the wireless communication system 20. For example, the wireless communication protocols and technologies can be Wi-Fi, WiMAX, Bluetooth®, etc. In the embodiment described, the network interface 42 is able to communicate with the network interface 34 of the server for receiving and transmitting data.

The device 24 also comprises a sensor or detector system or a set of sensors or detectors 50. Individual sensors within the set of sensors 50 are operable to monitor, sense and gather sensor data or information associated with or relating to characteristics, properties and parameters of components of the system 10, the environment, or elements or devices associated therewith or coupled thereto such as the communication system 20, including signal data of or associated with respective one or more signals from, of, or associated with the network 26. For example, the set of sensors 50 is operable to sense and gather sensor data relating to a state of the device 24 or a state of the environment surrounding the device 24. The state of the device 24 includes at least one of an operating mode (including whether the device 24 is powered on/off, or being used for a communication such as a call), an orientation, a position or location, a velocity, and a speed of the device 24, and a proximity of the device 24 to a source of at least potential interference or obstruction, such as an external body. In the embodiment described, the set of sensors 50 include an operating mode sensor, a signal strength sensor 52, an inertial sensor system 53 comprising an acceleration sensor 54 and an orientation sensor 55, a direction sensor 56, and a proximity sensor 58.

For example, the signal strength sensor 52 may be operable and configured to measure signal strength at the device 24 with respect to one or more access points 21, 22 and generate one or more signal strength indicators preferably in the form of RSSI. In such a case, the signal data comprises an RSSI.

The acceleration sensor 54 may be an accelerometer for measuring an acceleration of the device 24 and producing an acceleration data. The direction sensor may be operable to determine a direction relative to the Earth's magnetic poles and produce a direction data. For example, the direction sensor 56 may be an electronic compass. The orientation sensor 55 may be a gyroscope for measuring the rate of change of the orientation (i.e., angular rate) of the mobile station 24 and producing an orientation data. In embodiments of the invention where a position sensor is provided, it may be a Global Positioning System (GPS) for determining the position of the mobile station 24 and producing a position data.

The device 24 comprising the above-described set of sensors 50 may be any one of those commercially available. For example, a smartphone such as that marketed under the trademark iPhone 4® by Apple Inc. Alternatively, the mobile device 24 may be made with or operably coupled with or to sensors of the above-described set of sensors 50.

In the embodiment described, the mobile device 24 has a suitable Operating System (OS) 46 installed in the storage medium 42. For example but without limitation, the OS may be iOS, SYMBIAN, RIM BLACKBERRY, WINDOWS MOBILE, LINUX, GOOGLE ANDROID or Web OS. The OS 46 is configured to control the overall operation of the device 24 when executed by the processor 40. In addition, the device 24 preferably has a program or application 48 installed in the storage medium 42 for controlling the device 24 to perform an operation or a function when executed by the processor 40. However, it will be apparent to the person skilled in the art that the application 48 need not be installed in the storage medium 42 of the device 24 and can instead be located in a storage medium remote from the device 24 but which can be accessed by the processor 40 of the device 24 for execution.

The application 48, when implemented in software, may be a source program, executable program (object code), script or any other entity comprising a set of instructions to be performed. In the case of the mobile station 24 being an iPhone® smartphone, the application may be developed using application development tools, such as those provided by Apple Inc., well known in the art to create application(s) operable on iPhone® smartphones.

Alternatively, the application 48 may be implemented in hardware. In such a case, for example, the application 48 may be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA) and the like.

In the embodiment described, the device 24, under the control of the application 48, is operable to determine effects of one or more factors on one or more properties of a signal received by the device 24 and implement actions as herein described. The one or more properties include attenuation of the signal, whilst the one or more factors include anisotropic signal reception properties of the device 24; the orientation of the device 24; and proximity of the device 24 to a source of at least potential obstruction or interference.

Figure 3:
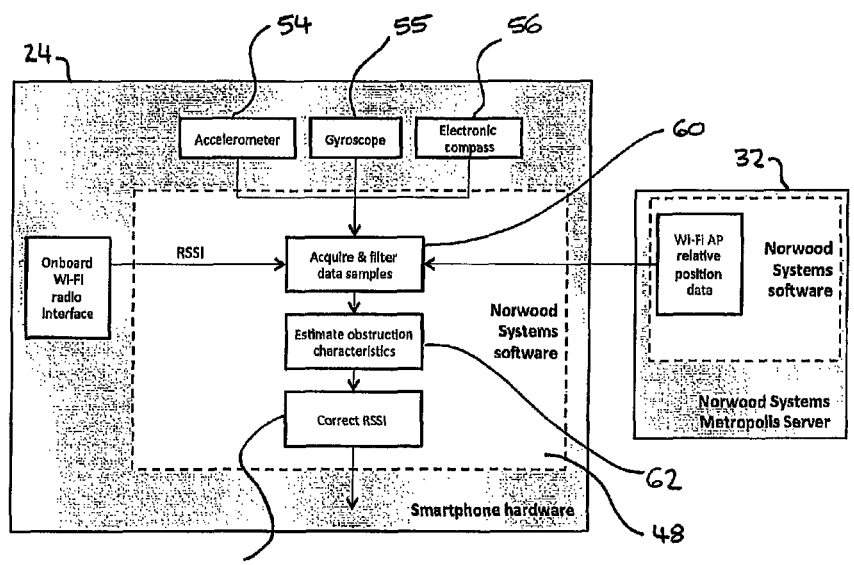
FIG. 3 depicts an exemplary architecture of the system according to the embodiment of the present invention.

The application 48 comprises decision means for receiving input including the sensor data, determining whether one or more criteria are satisfied based on the input, each criteria being associated with a respective factor affecting a respective property, and determining the effects on the one or more properties of the signal on the basis of the criteria determination and can be functionally categorised into a plurality of modules or means. In the embodiment described, these modules or means include a data acquisition module or means 60, a performance modelling module or means 62, a correction decision module or means 64, and a location estimation module or means, as shown in FIG. 3 by way of example and not limitation.

The data acquisition module (DAM) 60 is operable to receive the sensor data from one or more of the sensor(s) of the set of sensors 50 as input(s). The data acquisition module 60 is also configured to receive other input, such as contextual data from the server 32, which may be managed by a network position data module stored thereon. Preferably, the contextual data is received by the data acquisition module 60 using wireless communication technology such as Wi-Fi.

In the embodiment described, the data acquisition module 60 is operable to receive and responsible for capturing operating mode data from the operating mode sensor, the RSSI signal data from the RSSI sensor 52, the acceleration data from the acceleration sensor 54, the directional data from the direction sensor 56, the orientation data from the orientation sensor 55, and proximity data from the proximity sensor 58.

The data acquisition module 60 is also operable and configured to communicate or transmit the received sensor data collected to the performance modelling module 62.

Preferably, the data acquisition module 60 is operable to filter one or more of the above-described types of sensor data received and to transmit the filtered sensor data to the performance modelling module 62. For example, prior to transmitting the received acceleration data to the data acquisition module 60, the acceleration data can be filtered using low or high pass filters depending on the signal desired to be extracted from the acceleration data. In general, filtered sensor data can improve the performance estimated by the performance modelling module 62 (described below) since the sensor data can be filtered to, for example, remove an unwanted component of the data or extract a desirable component of the data.

The performance modelling module 62 is operable to receive input including the sensor data from the data acquisition module 60 and to model a performance of the device based thereon.

In the embodiment, the performance modelling module 62 is operable to use the input to construct a representation of one or more performance characteristics of the device 24. In the embodiment described, the performance characteristics include signal reception properties of the device 24.

Figure 4:
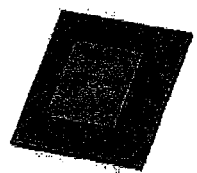
FIG. 4 depicts an example of three-dimensional radiation characteristics of an antenna of a wireless communication enabled device.
Figure 4:
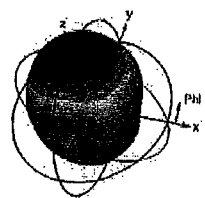
Figure 4:
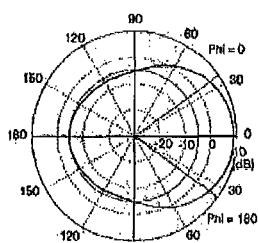
Figure 4:
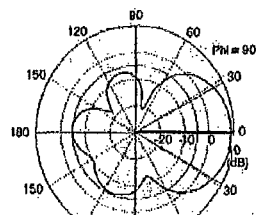

A representation or model comprising a three dimensional (3D) map of signal reception properties particular to the device 24 is stored in the storage medium 42. This 3D map, which may be referred to as a performance map, is likely to display anisotropy, that is, a variation in reception characteristics at different orientations of the device 24 relative to the transmitting access point 21, 22 or base station. The performance map is operably linked with the device 24. As the performance map rotates with the device 24, so its characteristics in the world reference frame can be calculated by determining the attitude of the device 24 using relevant sensor(s) of the set of sensors 50. FIG. 4 depicts an example of three-dimensional radiation characteristics of an antenna of a wireless communication enabled device in this regard.

Figure 5:
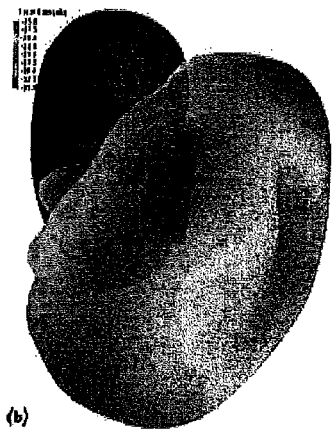
FIG. 5 depicts an exemplary three-dimensional map of signal reception strength of a wireless communication enabled device, with attenuation due to the present of a user's head.

As will be described in further detail below, the performance modelling module 62 is operable to adjust an appropriately rotated 3D map of signal reception properties to account for the presence of a source of at least potential obstruction or interference (such as a human head) if it is determined that a handset of the device 24 is likely being held to the user's ear during a call or other communication. FIG. 5 of the drawings depicts an example of a 3D map of signal reception strength, with attenuation due to the presence of a user's head.

The performance modelling module 62 is also operable to estimate or determine the state of the device 24 based on the input received.

For example, the state of the device 24 includes the orientation of the device 24 at a particular moment in time or whenever the relevant data was read or processed. The performance modelling module 62 receives and processes the orientation data and generates an estimate or determination of the orientation of the device 24 based thereon.

Additionally, the performance modelling module 62 is operable to estimate or determine the state of the environment surrounding the device 24 based on the input received.

For example, the state of the environment surrounding the device 24 includes a proximity to a source of at least potential obstruction or interference to signals. Preferably, the source comprises the head of a user or operator of the device 24. The performance modelling module 62 receives and processes the proximity data and generates an estimate or determination of the proximity of the device 24 to the source based thereon.

Figure 6:
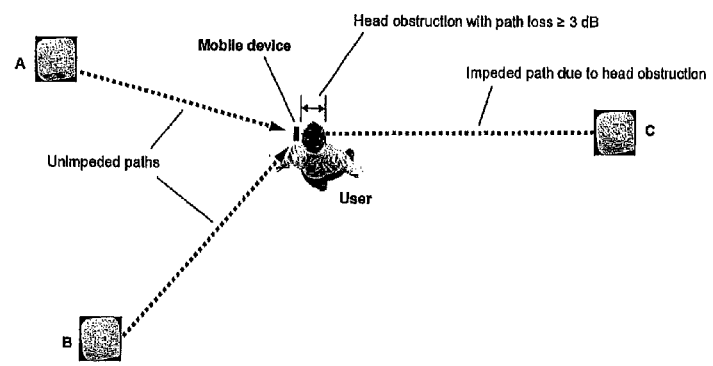
FIG. 6 depicts an example of path loss introduced by the head of a user of a wireless communication enabled device when on a call.

FIG. 6 depicts an example of path loss introduced by the head of a user of a wireless communication enabled device when on a call.

The performance modelling module 62 is operable to prepare an adjusted or revised 3D map of signal reception properties particular to the device 24 taking into account the signal attenuation due to obstruction by the user's head.

In an embodiment of the invention, the above may be implemented, by forming a normalised map or other representation of a head attenuation function in spherical polar co-ordinates, where the device 24 is at the origin and the magnitude of the function in any direction is or relates to the attenuation of the signal strength along that vector. For example, a function where no attenuation occurred may be a sphere of radius 1 with the antenna of the device 24 at the centre or origin.

Similarly, in the implementation, the anisotropy of the device 24 is mapped into a similar 3D spherical polar form, with the vector of the direction of best reception normalised to 1 and directions of poorer reception scaled in proportion.

To calculate the magnitude of the total attenuation due to device anisotropy and head obstruction, the anisotropy map is rotated in three dimensions to correspond to the measured attitude of the device 24, while the head attenuation map is rotated around its vertical axis based on the estimated orientation of the head in the world reference frame.

The product of these two rotated spherical functions gives a third spherical function comprising a 3D map of the total attenuation factor in all directions for the device 24 at its current position and orientation with respect to the base stations and the user's head.

In embodiments of the invention, the initial map of head attenuation may be constructed on the basis of data obtained via experiments isolating this attenuation from the effects of antenna anisotropy.

In a preferred embodiment, the representation(s) or mapping(s) are stored using a neural network due to their conciseness and efficiency at approximating complex continuous functions. The invention is not limited in this regard, and they may, of course, be stored using other techniques as appropriate.

In embodiments of the invention, the measurement and mapping of device anisotropy may also be obtained via experiments, or it may be obtained from the relevant manufacturer of the device 24. Furthermore, in embodiments of the invention the system is operable to determine a type of device 24 being used and, on the basis of the determination, download the correct anisotropic mapping for that device 24 from an appropriate storage means, such as the server 32, for example.

The correction decision module (CDM) 64 is operable to receive input including details of the processing performed and models or representations generated by the performance modelling module 62, a most recent location or position estimate for the device 24, sensor data from the data acquisition module 60, and contextual data including the fixed station location data from the server 32, and to make one or more decisions based thereon. Particularly, the correction decision module 64 is responsible for and operable to decide which base station RSSI data signal readings should have a correction applied to them in the embodiment described.

To make the decision, the correction decision module 64 is operable to determine whether one or more criterion is satisfied based on the input received. The correction decision module 64 is then further operable to apply a signal correction to at least one of the one or more received signal data based on the determination made to provide at least one corrected signal data.

In the embodiment, a first of the one or more criterion comprises whether a determined orientation of the device 24 corresponds to an orientation at which the device 24 suffers from reduced performance as a consequence of anisotropy.

To determine whether the first criterion is satisfied, the correction decision module 64 is operable to compare the determined orientation of the device 24 with the map of signal reception properties particular to the device 24. If the comparison shows that the determined orientation corresponds to an orientation at which the device 24 suffers from reduced performance as a consequence of anisotropy, then the first criterion is considered to be satisfied. The correction decision module 64 is then operable to apply a corresponding signal correction in the form of an appropriate signal strength correction factor to the relevant RSSI signal data to provide a corrected RSSI, adjusted to account for the anticipated reduced performance.

A second of the one or more criterion comprises whether: (1) a determined operating mode of the device 24 corresponds to an operating mode in which it is being used to make a call; (2) a determined proximity of the device 24 corresponds to a proximity to a source at which the device 24 suffers from reduced performance (i.e. from being next to the head of the user); and (3) the source is likely situated along or otherwise obstructing a radio or signal path between the device 24 and one or more of the access points 21, 22.

To determine whether the second criterion is satisfied, the correction decision module 64 analyses and compares the determined operating mode of the device 24, the determined proximity of the device 24 and the estimated signal attenuation due to the user's head with the network topology. The analysis and comparison comprises utilising a reliable reference orientation of the device 24 using world coordinates and linking the orientation information to the underlying geometry of the access points 21, 22. If the comparison shows that the user is on a call and the position of the device 24 relative to the access points 21, 22 is such that signals there-between will be obstructed by the head of the user then the second criteria is considered to be satisfied. When such a test returns positive, indicating a high likelihood of obstruction, correction decision module 64 is then operable to apply a corresponding signal correction in the form of an appropriate signal strength correction factor to the relevant RSSI signal data to provide a corrected RSSI, adjusted to account for the anticipated reduced performance.

This improves the estimate for free space path loss between the mobile station 24 and each of the fixed stations, improving the accuracy of the localization algorithm used to locate the user in the embodiment described.

The location estimation module is then operable to estimate or determine the location of the device 24 based on the at least one corrected signal data.

For example, the location or position estimate is determined via a wireless localization method using a plurality of the corrected RSSI sensed at the device 24, with respect to nearby access points 21, 22.

In this way, the embodiment of the invention reduces the impact on device localization of two of the potential sources of path loss variability, being the impact of anisotropic reception characteristics of the mobile device, and the impact of a human body in the vicinity of the mobile device, thereby improving location accuracy.

It will be appreciated that the embodiment of the invention provides several advantages.

Firstly, it allows the location or position of a mobile communication device to be more accurately estimated or determined by reducing radio signal strength localization error using knowledge of base station geometry and orientation of the device to correct for antenna anisotropy and user "head loss" when doing RSSI localization using multiple base stations. Particularly, the embodiment of the invention reduces two sources of uncertainty when attempting to locate a device by using multiple RSSI when triangulating the position of a smartphone device, namely the impact of the orientation of the device relative to the base stations, as well as the presence a human body has on the accuracy of one or more of the RSSI readings when measuring nearby base station readings.

The embodiment of the invention provides a new fundamental approach to improving, in a non-intrusive manner, the accuracy of RSSI based localization, allowing for improvement in the reliability of location estimates for mobile devices operating in a multi-base station environment.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

Additionally, throughout the specification, unless the context requires otherwise, the words "substantially" or "about" will be understood to not be limited to the value for the range qualified by the terms.

It will be clearly understood that, if a prior art publication is referred to herein, that reference does not constitute an admission that the publication forms part of the common general knowledge in the art in Australia or in any other country.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Although not required, the embodiments described with reference to the method, computer program, data signal and aspects of the system can be implemented via an application programming interface (API), an application development kit (ADK) or as a series of program libraries, for use by a developer, for the creation of software applications which are to be used on any one or more computing platforms or devices, such as a terminal or personal computer operating system or a portable computing device, such as a smartphone or a tablet computing system operating system, or within a larger server structure, such as a 'data farm' or within an enterprise transaction processing system.

Generally, as program modules include routines, programs, objects, components and data files that perform or assist in the performance of particular functions, it will be understood that the functionality of the software application may be distributed across a number of routines, programs, objects or components to achieve the same functionality as the embodiment and the broader invention claimed herein. Such variations and modifications are within the purview of those skilled in the art.

It will also be appreciated that where methods and systems of the present invention and/or embodiments are implemented by computing systems or partly implemented by computing systems then any appropriate computing system architecture may be utilised. This includes standalone computers, network computers and dedicated computing devices (such as field-programmable gate arrays).

Where the terms "computer", "computing system" and "computing device" are used in the specification, these terms are intended to cover any appropriate arrangement of computer hardware for implementing the inventive concept and/or embodiments described herein.

Where reference is made to telecommunication standards, methods and/or systems, it will be understood that such standards, method and/or systems are provided by way of example only, and it will be understood that a mobile device may transmit and receive data via any suitable form including but not limited to 3G, 4G (CDMA/GSM), Wi-Fi, Bluetooth, other radio frequency, optical, acoustic or magnetic form or method of communication that may become available from time to time.

The invention claimed is:

1. A system for locating a wireless communication enabled device in a wireless communication network including a plurality of access points, wherein said system accounts for attenuation of a signal received by said device from said network caused by proximity of said device to a head of a user or operator of said device, the system comprising:
at least one sensor for sensing and gathering sensor data associated with a strength of the signal received from one or more of the plurality of access points;
a decision means for receiving the sensor data and determining a level of the attenuation caused by the proximity of said device to the head of the user or operator of said device;
a correction means for applying a signal correction to account for the determined level of the attenuation caused by the proximity of said device to the head of the user or operator of said device and provide at least one corrected signal data; and
an action means for implementing an action based on the at least one corrected signal data wherein said action means comprises an estimation means for estimating a location of said device based on the at least one corrected signal data.

2. A system in accordance with claim 1, further adapted to account for the effect of anisotropic signal reception properties of said device.

3. A system in accordance with claim 1, further adapted to account for the effect of the orientation of said device.

4. A system in accordance with claim 1, further comprising a controller controllable by electronic program instructions, and wherein at least one of the decision means, correction means, and action means are implemented as electronic program instructions stored on a storage means.

5. A system in accordance with claim 4, wherein the controller comprises a processing means, and the storage means, in addition to storing electronic program instructions for controlling the controller, also stores information or data including the signal correction.

6. A system in accordance with claim 1, wherein the signal correction comprises a signal correcting factor.

7. A system in accordance with claim 1, wherein the decision means is adapted to implement an action based on the estimated location of the wireless communication enabled device.

8. A system in accordance with claim 1, wherein there is a plurality of signal corrections, and the decision means is adapted to determine which of the plurality of signal corrections is to be applied.

9. A system in accordance with claim 1, further comprising performance modelling means operable to use the sensor data to construct a model or representation of one or more performance characteristics of the device.

10. A system in accordance with claim 1, further adapted to determine a state of the wireless communication enabled device, wherein the state is at least one state selected from the list comprising: an operating mode, an orientation, acceleration, velocity and speed.

11. A system in accordance with claim 1, wherein the sensor data associated with the strength of the signal comprises a Received Signal Strength Indicator (RSSI) measurement of the power present in the respective signal.

12. A system in accordance with claim 1, further adapted to determine the state of the environment surrounding the wireless communication enabled device wherein said device comprises one or more of data, information, details and/or knowledge of or associated with the wireless communication network, a network topology, physical and logical topology, and network performance.

13. A system in accordance with claim 12, wherein the state of the environment surrounding the wireless communication enabled device is determined by receiving or accessing a store of such data, information, details or knowledge.

14. A system in accordance with claim 1, wherein the wireless communication enabled device further comprises at least one of the at least one sensor, the decision means, the correction means, and the action means.

15. A system in accordance with claim 1, wherein the wireless communication enabled device further comprises an acquisition or receiving means for receiving the sensor data and outputting the sensor data as an input to the decision means.

16. A system in accordance with claim 1, wherein the at least one sensor comprises at least one of a signal strength sensor, an acceleration sensor, an orientation sensor, a direction sensor, a position sensor, and a proximity sensor.

17. A system in accordance with claim 1, wherein the signal data comprises an RSSI, the corrected signal data comprises a corrected RSSI, and the estimation means estimates the location of the wireless communication enabled device based on the corrected RSSI.

18. A system in accordance with claim 17, wherein the location estimate is determined via a wireless localization method using a plurality of the corrected RSSI.

19. A system in accordance with claim 16, wherein when the at least one sensor comprises an acceleration sensor, the acceleration sensor is operable to measure an acceleration of the wireless communication enabled device and to generate an acceleration data based on the acceleration measured.

20. A system in accordance with claim 19, wherein the acceleration sensor is an accelerometer.

21. A system in accordance with claim 20, wherein the accelerometer is operable to sense accelerations in three orthogonal axes.

22. A system in accordance with claim 16, wherein when the sensor comprises an orientation sensor, the orientation sensor is operable to measure a rate of change of the orientation of the wireless communication enabled device and to generate an orientation data based on the rate of change of the orientation measured.

23. A system in accordance with claim 22, wherein the orientation sensor is a gyroscope.

24. A system in accordance with claim 23, wherein the gyroscope is operable to sense rotations in three orthogonal axes.

25. A system in accordance with claim 16, wherein when the sensor comprises a direction sensor, the direction sensor is operable to determine a direction relative to the Earth's magnetic poles.

26. A system in accordance with claim 25, wherein the direction sensor is an electronic compass.

27. A system in accordance with claim 26, wherein the electronic compass comprises a magnetometer operable to sense the Earth's magnetic field in three orthogonal axes.

28. A system in accordance with claim 1, wherein the action comprises: making a handover of a connection the wireless communication enabled device has established with a serving access point of the plurality of access points of the wireless communication network, each of the access points providing network coverage in a vicinity thereof, to a target access point of the plurality of access points; determining and providing notification of a location in an indoor environment; and/or operating a device.

29. A method for determining effects of proximity of a wireless enabled communication device to a head of a user or operator of said device on attenuation of a signal received by said device from a wireless communication network including a plurality of access points, the method comprising:
  sensing and gathering sensor data associated with a strength of the signal from one or more of the plurality of access points;
  receiving input including the sensor data and determining a level of the attenuation caused by proximity of said device to the head of the user or operator of said device;
  applying a correction to the sensor data to account for the determined level of attenuation caused by proximity of said device to the head of the user or operator of said device to produce at least one corrected signal; and
  estimating a location of said device based on the at least one corrected signal.

30. A method according to claim 29 further comprising the steps of:
  sensing and gathering sensor data associated with the effect of anisotropic signal reception properties of the wireless communication enabled device; and
  applying a correction to said sensor data to account for the effect of anisotropic signal reception properties of the wireless communication enabled device to produce at least one corrected signal.

31. A method according to claim 29 further comprising the steps of:
  sensing and gathering sensor data associated with the effect of the orientation of the wireless communication enabled device; and
  applying a correction to said sensor data to account for the effect of the orientation of the wireless communication enabled device to produce at least one corrected signal.

* * * * *